United States Patent
Isaka

(10) Patent No.: US 9,231,497 B2
(45) Date of Patent: Jan. 5, 2016

(54) OPTICAL MEMBER DRIVING APPARATUS AND LENS APPARATUS HAVING THE SAME

(71) Applicant: CANON KABUSHIKI KAISHA, Tokyo (JP)

(72) Inventor: Mitsuhiro Isaka, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 5 days.

(21) Appl. No.: 14/311,424

(22) Filed: Jun. 23, 2014

(65) Prior Publication Data

US 2014/0376117 A1    Dec. 25, 2014

(30) Foreign Application Priority Data

Jun. 25, 2013  (JP) ................................ 2013-132327

(51) Int. Cl.
  *G02B 7/02* (2006.01)
  *G03B 3/10* (2006.01)
  *G03B 13/34* (2006.01)
  *H02N 2/02* (2006.01)
  *G02B 7/10* (2006.01)
  *G02B 7/08* (2006.01)
  *H02N 2/00* (2006.01)

(52) U.S. Cl.
  CPC ................... *H02N 2/026* (2013.01); *G02B 7/08* (2013.01); *G02B 7/10* (2013.01); *G03B 3/10* (2013.01); *G03B 13/34* (2013.01); *H02N 2/0055* (2013.01)

(58) Field of Classification Search
  CPC ............. G02B 7/10; G03B 3/10; G03B 13/34

USPC .......................................... 359/824; 396/133
See application file for complete search history.

(56) References Cited

U.S. PATENT DOCUMENTS

2006/0238904 A1*  10/2006  Nakashima et al. .......... 359/824

FOREIGN PATENT DOCUMENTS

| JP | 2005-354830 A | 12/2005 |
| JP | 2005-354866 A | 12/2005 |
| JP | 2010-172160 A | 8/2010 |

* cited by examiner

*Primary Examiner* — William Choi

(74) *Attorney, Agent, or Firm* — Rossi, Kimms & McDowell LLP

(57) ABSTRACT

An optical member driving apparatus includes an optical member holder holding an optical member, which is rectilinearly guided and has a rotating member supported rotatably about a rotation shaft extending perpendicularly to a movable direction in which the optical member holder is movable, a fixed member that extends in the movable direction, has two sliding surfaces facing each other with predetermined spacing therebetween, and is arranged in such a way that the rotating member is located between the two sliding surfaces, two movers each of which includes a base and a vibrator connected to the base, and a controller that controls driving of the two vibrators to move the optical member holder in the movable direction. The vibrators of the two movers are in pressure contact with one and the other of the two sliding surfaces respectively. The rotating member is rotatably held between the bases of the two movers.

8 Claims, 3 Drawing Sheets

OPTICAL MEMBER DRIVING APPARATUS AND LENS APPARATUS HAVING THE SAME

BACKGROUND OF THE INVENTION

1. Field of the Invention

The present invention relates to an optical member driving apparatus used in a lens apparatus, and more particularly to an optical member driving apparatus using a piezoelectric linear actuator. The present invention also relates to a lens apparatus and image pickup apparatus having such an optical member driving apparatus.

2. Description of the Related Art

In a known design of a lens apparatus having a movable lens such as a zoom lens or a focus lens that is movable along the optical axis, a lens holding frame holding the movable lens is driven along the optical axis direction by a piezoelectric linear actuator. There have been developed lens driving mechanisms of this type in which a plurality of piezoelectric linear actuators are used to drive the lens holding frame in order to achieve higher torques and/or higher driving speeds.

Japanese Patent Application Laid-open No. 2010-172160 discloses a structure in which a plurality of sliding members are arranged to be in contact with a plurality of vibrators arranged in relative directions. The single control signal is supplied to the vibrators to drive the sliding members in opposite directions with a relatively large stroke at a high relative speed.

However, in the structure disclosed in Japanese Patent Application Laid-Open No. 2010-172160, the sliding members can be driven only in opposite directions relative to the member on which the vibrators are fixed, and this patent document does not teach to drive them in the same direction. In the case where the sliding members are driven in the same direction by the single control signal, a difference in output characteristics of ultrasonic linear actuators might cause the vibrator to tilt, resulting in a load acting on the ions holding frame. Then, stable driving cannot be achieved.

SUMMARY OF THE INVENTION

An object of the present invention is to provide an optical member driving apparatus including an actuator using two piezoelectric linear actuators that drive an optical member holder as one and the same driven member in the same direction and capable of driving a lens holding frame stably without being affected by a difference in output characteristics of the two piezoelectric linear actuators even if the two piezoelectric linear actuators are controlled by a single control signal.

An optical member driving apparatus comprising an optical member holder holding an optical member, rectilinearly guided, and having a rotating member supported in such a way as to foe rotatable about a rotation shaft extending perpendicularly to a movable direction in which the optical member holder is movable; a fixed member extending in the movable direction, having two sliding surfaces facing each ether with predetermined spacing therebetween, and arranged in such a way that the rotating member is located between the two sliding surfaces; two movers, each including a base and a vibrator connected to the base; and a controller that controls driving of the two vibrators in such a way as to move the optical member holder in the movable direction, wherein the vibrators of the two movers are in pressure contact with one and the other of the two sliding surfaces respectively, and the rotating member is rotatably held between the bases of the two movers.

According to the present invention, there can be provided an optical member driving apparatus including an actuator using two piezoelectric linear actuators that drive an optical member holder as one and the same driven member in the same direction and capable of driving a lens holding frame stably without being affected by a difference in output characteristics of the two piezoelectric linear actuators even if the two piezoelectric linear actuators are controlled by a single control signal.

Further features of the present invention will become apparent from the following description of exemplary embodiments with reference to the attached drawings.

DESCRIPTION OF THE EMBODIMENTS

A preferred embodiment of the present, invention will now be described in detail in accordance with the accompanying drawings.

Figure 1:
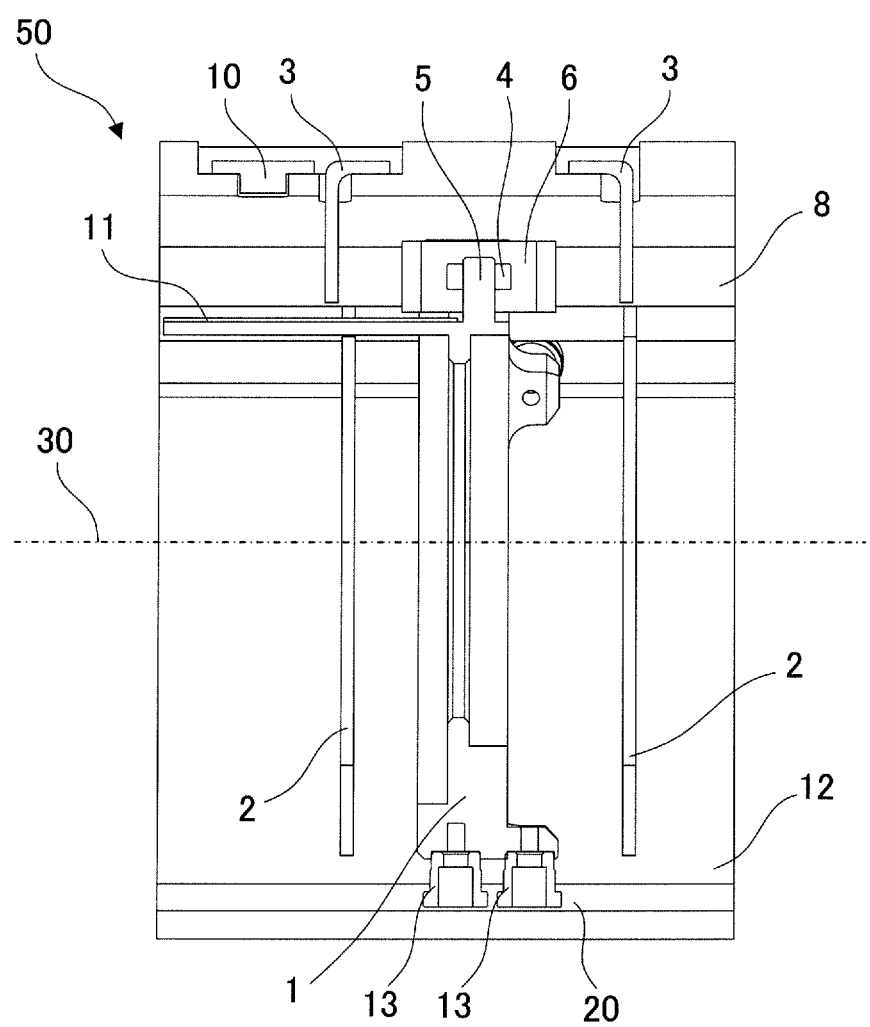
FIG. 1 is a cross sectional view of a lens driving apparatus.
Figure 2:
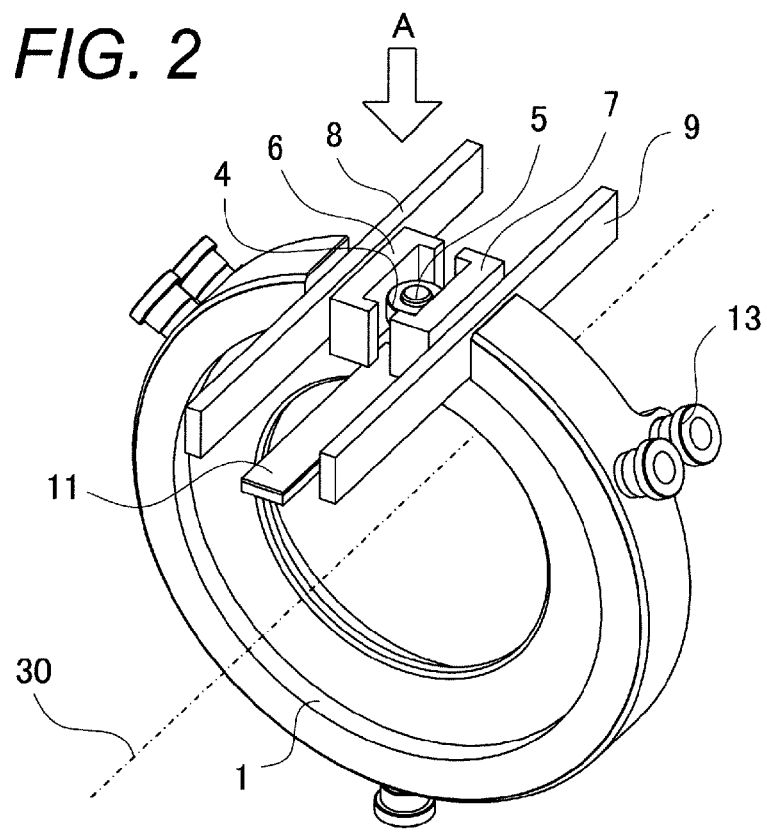
FIG. 2 is a perspective view of the lens driving apparatus.
Figure 3:
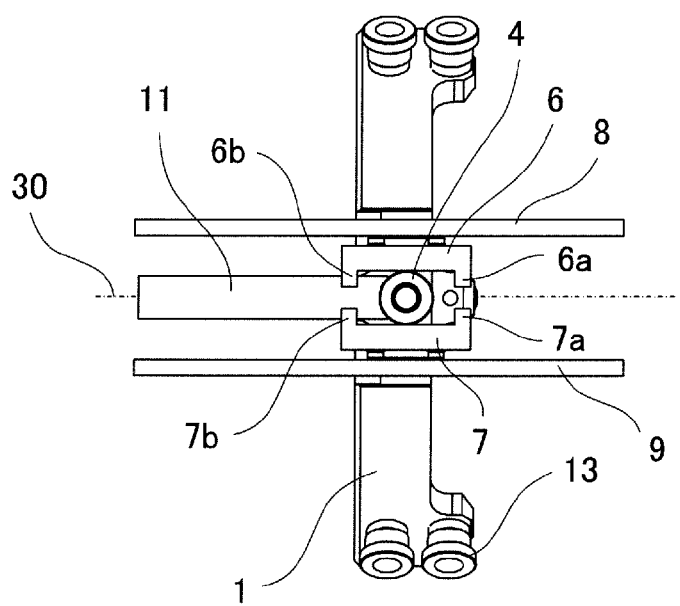
FIG. 3 is a diagram showing the lens driving apparatus shown in FIG. 2 as seen from the direction of arrow A.

FIG. 1 is a cress sectional view of a lens driving apparatus 50 according to the embodiment. FIG. 2 is a perspective view illustrating a driving mechanism of the lens driving apparatus 50 (or optical member driving apparatus) according to the embodiment. FIG. 3 is a diagram illustrating the lens driving apparatus shown in FIG. 2 seen from the direction of arrow A in FIG. 2. The driving mechanism of the lens driving apparatus will now be described with reference to FIGS. 1 to 3.

The lens driving apparatus 50 includes a fixed barrel 12 having a plurality of rectilinear grooves 20 arranged about the optical axis 30. The rectilinear grooves 20 are adapted to allow a lens holding frame 1 to slide along the optical axis direction 30. Lens holding frame edge members 2 and mover edge members 3 are fixedly attached to the fixed barrel 12. The lens holding frame edge members 2 and the mover edge members 3 restrict the driving ranges of the lens holding frame 1 (optical member holder) and movers 6, 7 with respect to the optical axis direction 30. Specifically, the mechanical driving ranges of the lens holding frame 1 and the movers 6, 7 along the optical axis direction 30 are restricted by the abutment of the lens holding frame 1 with the lens holding frame edge members 2 and the abutment of the movers 6, 7 with the mover edge members 3 respectively. The lens holding frame edge members 2 and the mover edge members 3 are arranged in such a way that the lens holding frame 1 and the movers 6, 7 have driving ranges equal to each other. Cam followers 13 that engage with the rectilinear groove 20 are provided on the lens holding frame 1, which holds a lens unit not shown in the drawings, at a plurality of positions about and along the optical axis 30. The lens holding frame 1 is guided by the rectilinear grooves 20 and the cam followers 13 to move rectilinearly along the optical axis direction 30. The lens holding frame 1 is provided with a projection 5 (rotation shaft) projecting in a direction perpendicular to the optical axis direction 30. A rotating member 4 is rotatably supported by the projection 5 on the lens holding frame 1. Each of the movers 6, 7 has a mover base (which will be simply referred to as the "base" hereinafter) and an ultrasonic vibrator (which will be simply referred to as the "vibrator" hereinafter) coupled to the base. As shown in FIG. 3, the movers 6, 7 are arranged in such a way that the rotating member 4 is held between their bases. Fixed members 8, 9 are arranged in such a way that the movers 6, 7 are located between them. The vibrators of the movers 6, 7 are in pressure contact with sliding surfaces of the fixed members 8, 9. The sliding surfaces of the fixed members 8, 9 extend in the direction in which the lens holding frame is movable and are arranged parallel to and facing each other with predetermined spacing therebetween. The fixed members 8, 9 are arranged in such a way that the rotating member 4 is located between the two sliding surfaces. The fixed members 8, 9 are fixed on the fixed barrel 12 in such a way as to exert pressing forces to the rotating member 4 in directions toward the center of rotation and to be in pressure contact, with the movers 6, 7. The vibrators of the movers 6, 7 have piezoelectric elements, and voltages are applied to the vibrators of the movers 6, 7 by a voltage supply unit (controller) not shown in the drawings to excite ultrasonic vibration of a predetermined mode in the vibrators. Frictional force acting on the pressure contact surfaces between the sliding surfaces of the fixed members 8, 9 and the vibrators serves as driving force that moves the lens holding frame 1, the rotating member 4, and the movers 6, 7 forward/backward along the optical an is direction 30 under rectilinear guiding by the rectilinear grooves 20 provided on the fixed barrel 12.

In each of the movers 6, 7, the vibrator and the base may be fixedly and directly coupled together, and the movers 6, 7 may be set between the fixed members 8, 9 and the rotating member 4 in such a way that predetermined pressing force acts between the vibrator and the sliding surface and between the base and rotating member 4. Alternatively, the vibrator and the base of each mover 6, 7 may be coupled together by means of an elastic member, and the elastic member may be adapted to generate pressing force acting between the vibrator and the sliding surface and between the base and rotating member 4. The latter arrangement can help reduction in the change in the pressing force acting between the contact surfaces due to individual differences and changes in characteristics and/or shapes of the components with time.

Next, how the position of the lens holding frame 1 is detected will, be described. A position detection sensor 10 having an integrated light emitting and light receiving element of an optical encoder is fixedly attached to the fixed barrel 12 (in such a way as to foe immobile relative to the fixed members 8, 9). A scale 11 for detection of the position of the lens holding frame 1 relative to the fixed members 8, 9 with respect to the optical axis direction 30 is provided on the lets holding frame 1 at a location near the projection 5. The scale 11 extends along the optical axis direction 30. Locating the scale 11 near the projection 5 enables detection of the average position of the movers 6, 7 even when there is a difference in output characteristics between the mover 6 and the mover 7. The optical encoder used in this embodiment may be, for example, a reflective encoder. The relative position of the scale 11 and the position detection sensor 10 may be detected or measured by projecting light onto the scale 11 and reading the light reflected by the scale 11 by the position detection sensor 10.

Figure 4A:
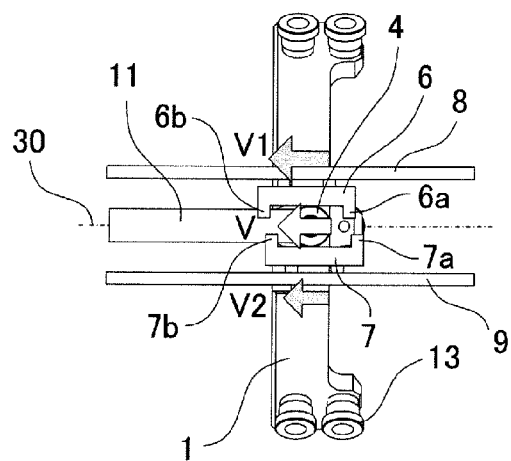
FIGS. 4A and 4B are diagrams illustrating how the lens holding frame moves when there is a difference in output characteristics between the movers.

Next, there will be described a mechanism for moving the lens holding frame as the driven part stably while absorbing the difference in the output characteristics between the movers 6 and 7 in the case where the single control signal is supplied to the two movers 6, 7 from the voltage supply unit (controller) not shown in the drawings to control them. As shown in FIG. 3, the movers 6, 7 are arranged in such a way that their bases hold the rotating member 4 between the bases of the movers 6, 7 and are in pressure contact with the rotating member 4 and that their vibrators are held between the fixed members 8, 9 and in pressure contact with the fixed members 8, 9. The mover 6 (7) is provided with projections 6a, 6b (7a, 7b). The projections 6a, 6b (7a, 7b) prevent the mover 6 (7) from being dislocated from the rotating member 4. Let us assume that there is a difference in output characteristics between the mover 6 and the mover 7, and their velocities are V1 and V2 respectively. When V1>V2 as shown in FIG. 4A, the mover 6 tends to start driving earlier than the mover 7. In the case of an arrangement like that disclosed in Japanese Patent Application Laid-Open No. 2010-172160 in which the driven part and the movers are fixed, a difference in velocity between the movers causes the movers to incline, exerting tilting force to the lens holding frame, namely generating a load that prevents stable driving.

Figure 4B:
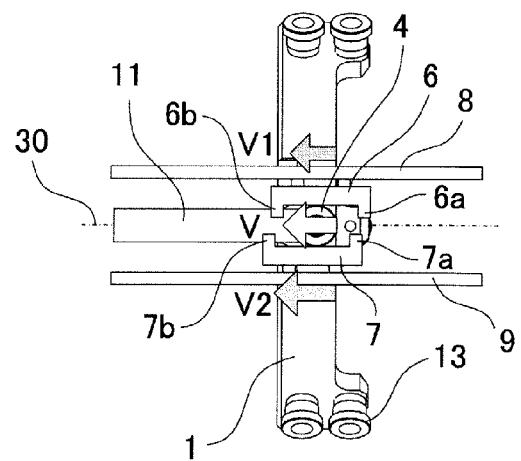

In the case of this embodiment, since the rotating member 4 to which the movers 6, 7 are in pressure contact is rotatable about the projection 5 of the lens holding frame 1, the rotating member 4 can roil on the surfaces of the bases. FIGS. 4A and 4B are diagrams illustrating how the lens holding frame moves when there is a difference in output characteristics between, the movers. FIG. 4A shows a case in which the velocity V1 of the mover 6 is larger than the velocity V2 of the mover 7 (V1>V2). FIG. 4B shows a case in which the velocity V1 of the mover 6 is smaller than the velocity V2 of the mover 7 (V1<V2). As shown in FIGS. 4A and 4B, with a difference in velocity between the mover 6 and the mover 7, the rotating member 4 rotates counterclockwise in the case shown in FIG. 4A and clockwise in the case shown in FIG. 4B to cancel the force acting on the lens holding frame 1. Therefore, it is possible to drive the lens holding frame 1 stably with a force approximately twice as strong as that in the case where the lens holding frame is driven by one linear actuator. The lens holding frame 1 is driven at a velocity V expressed by the equation $V=(V1+V2)/2$. The rotating member 4 is held between the bases of the two movers 6, 7 in such a way as to be able to rotate in accordance with the relative position of the two bases with respect to the direction in which they are movable.

The movers 6, 7 and fixed members 8, 9 may be arranged at any angular position on the circumference of the lens holding frame 1. In other word, the stable rectilinear movement of the lens holding frame 1 (optical member holder) can be ensured at any phase.

As described above, in this embodiment, the lens holding frame can be driven rectilinearly along the optical axis direction in a stable manner without being affected by a difference in output characteristics of the two movers in the case where the two movers are controlled by one control signal. This makes strict selection of movers unnecessary in the manufacturing process, and whether output characteristics of a piezoelectric linear actuator fall within a predetermined range can be used as the criterion for acceptability of the actuator. Moreover, since it is possible to control two piezoelectric linear actuators by the single control signal, control circuit and control process can be made simpler.

Figure 5:
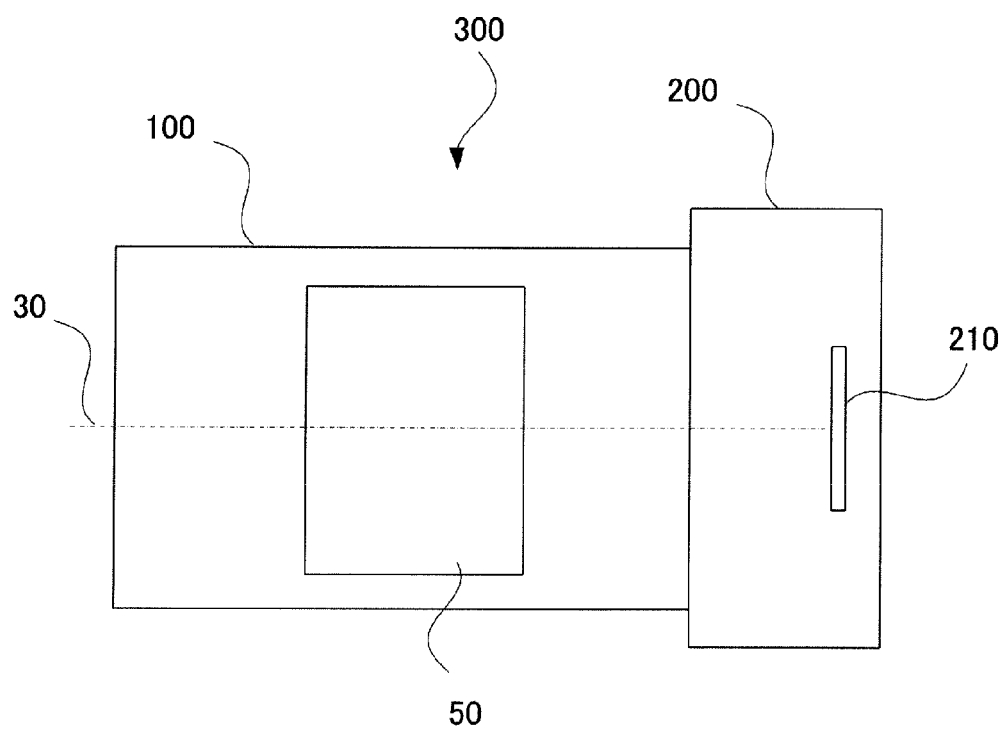
FIG. 5 is a schematic diagram of a lens apparatus and an image pickup apparatus using a lens driving apparatus according to the present invention.

FIG. 5 is a schematic diagram showing an image pickup apparatus 300 including a lens apparatus 100 having a lens driving apparatus according to the present invention, and a camera apparatus 200 that are connected, together. The camera apparatus 200 has an image pickup element 210 that receives light coming from an object through the lens apparatus 100. This image pickup apparatus 300 can also enjoy the advantageous effects of the present invention.

While in the foregoing description of the driving apparatus according to the present invention, a case in which the driving apparatus drives the lens along the optical axis direction has been, described by way of example, the present invention is not limited to this. The present invention can also be applied, for example, to a driving unit for a lens that is inserted into/retracted from the taking optical path, a driving unit for a stop, and other various driving units for movable parts in a lens apparatus. The advantageous effects of the present invention can be enjoyed in such cases also.

While an exemplary embodiment of the present invention has been described, the present invention is not limited to the embodiment, but various modifications and changes can be made thereto within the essence of the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading cut and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-132327, filed Jun. 25, 2013, which is hereby incorporated by reference herein in its entirety.

What is claimed is:

1. An optical member driving apparatus comprising:
   an optical member holder holding an optical member, rectilinearly guided, and having a rotating member supported in such a way as to be rotatable about a rotation shaft extending perpendicularly to a movable direction in which the optical member holder is movable;
   a fixed member extending in the movable direction, having two sliding surfaces facing each other with predetermined spacing therebetween, and arranged in such a way that the rotating member is located between the two sliding surfaces;
   two movers, each including a base and a vibrator connected to the base; and
   a controller that controls driving of the two vibrators in such a way as to move the optical member holder in the movable direction,
   wherein the vibrators of the two movers are in pressure contact with one and the other of the two sliding surfaces respectively, and the rotating member is rotatably held between the bases of the two movers.

2. An optical member driving apparatus according to claim 1, wherein the rotating member is held between the bases of the two movers in such a way that the rotating member is configured to rotate in accordance with a relative position of the two bases along the movable direction.

3. An optical member driving apparatus according to claim 1, wherein the vibrator is connected to the base by means of an elastic member, the vibrators are pressed against the sliding surfaces, and the bases are pressed against, the rotating member.

4. An optical member driving apparatus according to claim 1, wherein the controller drives the vibrators of the two movers by a single control signal.

5. An optical member driving apparatus according to claim 1, further comprising a scale for position detection and a position detection sensor that detects a position of the optical member holder relative to the fixed member with respect to the movable direction, the scale being fixed to the optical member holder and extending in the movable direction, and the position detection sensor being arranged to be immobile relative to the fixed member.

6. An optical member driving apparatus according to claim 1, wherein the optical member is a lens, and the movable direction is parallel to the optical axis.

7. A lens apparatus comprising an optical member driving apparatus, the optical member driving apparatus comprising:
   an optical member holder holding an optical member, rectilinearly guided, and having a rotating member supported in such a way as to be rotatable about a rotation shaft extending perpendicularly to a movable direction in which the optical member holder is movable;
   a fixed member extending in the movable direction, having two sliding surfaces facing each other with predetermined spacing therebetween, and arranged in such a way that the rotating member is located between the two sliding surfaces;
   two movers, each including a base and a vibrator connected to the base; and
   a controller that controls driving of the two vibrators in such a way as to move the optical member holder in the movable direction,
   wherein the vibrators of the two movers are in pressure contact with one and the other of the two sliding surfaces respectively, and the rotating member is rotatably held between the bases of the two movers.

8. An image pickup apparatus comprising:
   a lens apparatus; and
   an image pickup element that receives light coming from an object through the lens apparatus,
   the lens apparatus having an optical member driving apparatus,
   the optical member driving apparatus comprising:
      an optical member bolder holding an optical member, rectilinearly guided, and having a rotating member supported in such a way as to be rotatable about a rotation shaft extending perpendicularly to a movable direction in which the optical member holder is movable;
      a fixed member extending in the movable direction, having two sliding surfaces facing each other with predetermined spacing therebetween, and arranged in such a way that the rotating member is located between the two sliding surfaces;

two movers, each including a base and a vibrator connected to the base; and a controller that controls driving of the two vibrators in such a way as to move the optical member holder in the movable direction, wherein the vibrators of the two movers are in pressure contact with one and the other of the two sliding surfaces respectively, and the rotating member is rotatably held between the bases of the two movers.

* * * * *